United States Patent
Chen

(10) Patent No.: US 6,618,914 B1
(45) Date of Patent: Sep. 16, 2003

(54) FRAME FOR HOLDING AN ARTICLE ON THE OUTSIDE OF LUGGAGE

(75) Inventor: Shou Mao Chen, Taichung Hsien (TW)

(73) Assignee: TRG Accessories, LLC, St. Louis, MO (US)

( * ) Notice: Subject to any disclaimer, the term of this patent is extended or adjusted under 35 U.S.C. 154(b) by 0 days.

(21) Appl. No.: 10/040,005

(22) Filed: Jan. 8, 2002

(51) Int. Cl.7 ................................................. F16B 45/02
(52) U.S. Cl. ...................................... 24/598.7; 190/102
(58) Field of Search ...................... 24/598.7; 248/309.1; 190/102, 108; 294/82.17

(56) References Cited

U.S. PATENT DOCUMENTS

| | | | |
|---|---|---|---|
| 5,634,246 A | * 6/1997 | Jermyn, Jr. | ................. 24/601.5 |
| 5,769,475 A | * 6/1998 | Tylaska | ..................... 294/82.2 |
| 5,842,673 A | * 12/1998 | Fenton | ..................... 248/309.1 |
| 6,209,179 B1 | * 4/2001 | Shou-Mao | .................. 24/598.4 |
| 6,347,693 B1 | * 2/2002 | Chen | .......................... 190/102 |
| 6,374,467 B1 | * 4/2002 | Chen | ......................... 24/163 R |

FOREIGN PATENT DOCUMENTS

| | | | | |
|---|---|---|---|---|
| JP | 07251678 A | * 10/1995 | ............. B60R/7/08 |

* cited by examiner

*Primary Examiner*—James R. Brittain
(74) *Attorney, Agent, or Firm*—Lewis, Rice & Fingersh, LC

(57) ABSTRACT

A frame is designed for holding and attaching an article to the outside of a luggage and is formed of a main body and a fastening strap which is fixed at one end with the main body and is detachably retained at the other end by the main body. The main body is attached to the handle of the luggage.

2 Claims, 6 Drawing Sheets

FRAME FOR HOLDING AN ARTICLE ON THE OUTSIDE OF LUGGAGE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an article holding frame, and more particularly to an article holding frame for use in conjunction with luggage.

BACKGROUND OF THE INVENTION

There are always certain things that are used often while a person is traveling. It is conceivably inconvenient to keep these things inside luggage. In addition, a small briefcase or article holding bag may be conveniently attached to the outside of the luggage. There are certain conventional frames for holding articles to the outside of the luggage. These conventional frames are generally defective in design because they are complicated in construction, and because they are not cost-effective.

BRIEF SUMMARY OF THE INVENTION

The primary objective of the present invention is to provide a cost-effective frame for use in holding an article to the outside of a luggage.

The article holding frame of the present invention is formed of a main body and a fastening strap. The main body is provided at one longitudinal end with a through slot, and at the other longitudinal end with a retaining slot. The fastening strap is provided at one longitudinal end with a retaining portion, and at the other longitudinal end with a fastening portion. The fastening strap is joined with the main body such that the fastening portion of the fastening strap is fixedly retained in the retaining slot of the main body, and such that the retaining portion of the fastening strap is detachably retained in a retaining hole of the main body.

The features and the advantages of the present invention will be more readily understood upon a thoughtful deliberation of the following detailed description of the present invention with reference to the accompanying drawings.

DETAILED DESCRIPTION OF THE INVENTION

Figure 1:
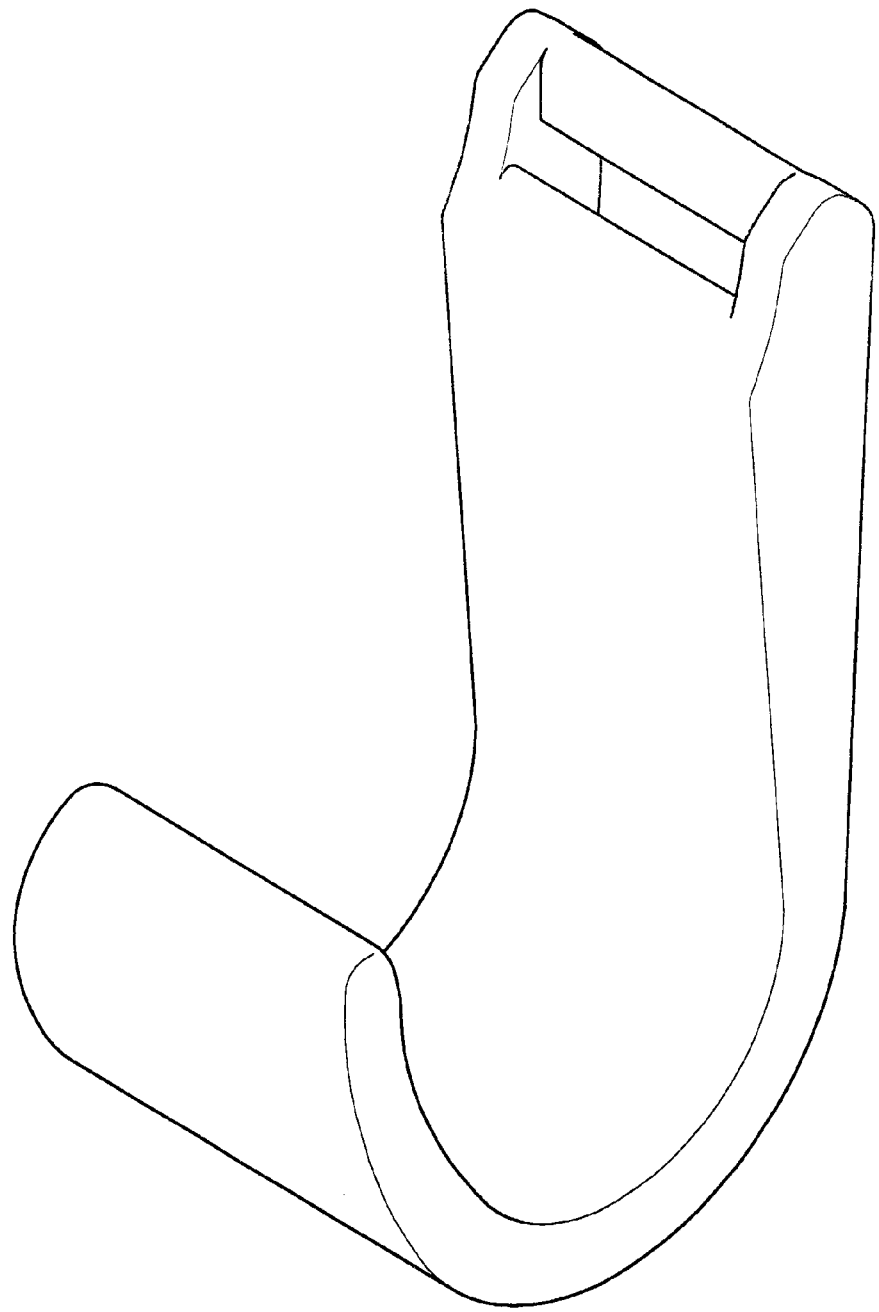
FIG. 1 shows a perspective view of a prior art frame for holding an article to the outside of a luggage.
Figure 2:
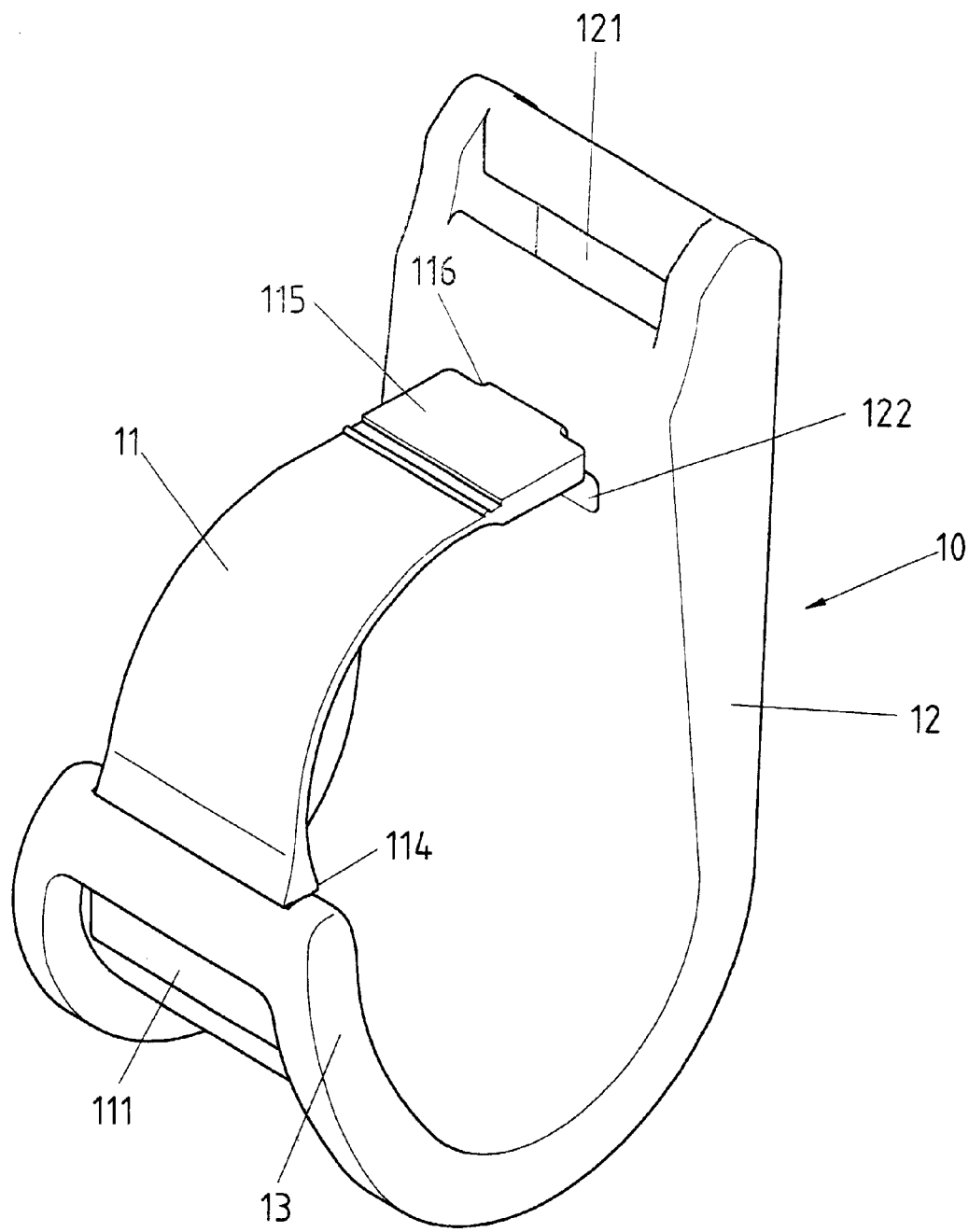
FIG. 2 shows a perspective view of the present invention.
Figure 3:
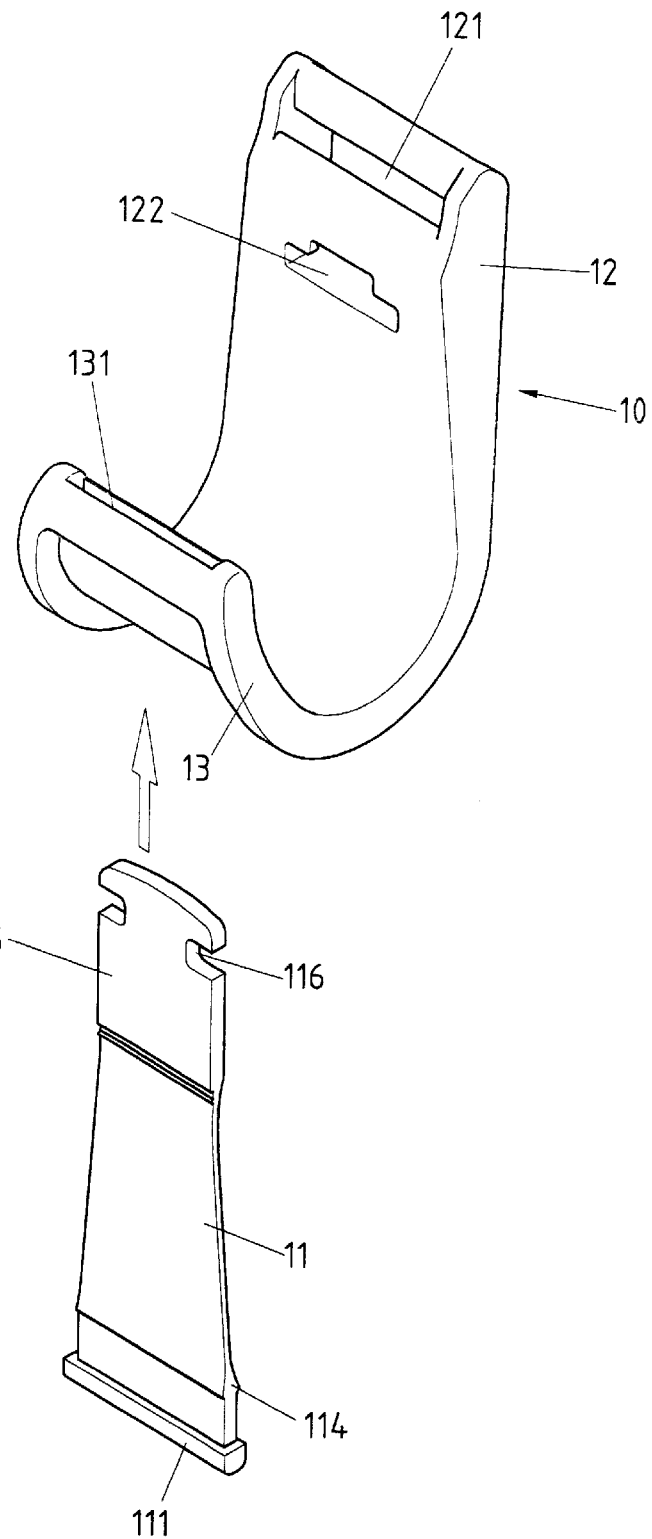
FIG. 3 shows an exploded perspective view of the present invention.
Figure 4:
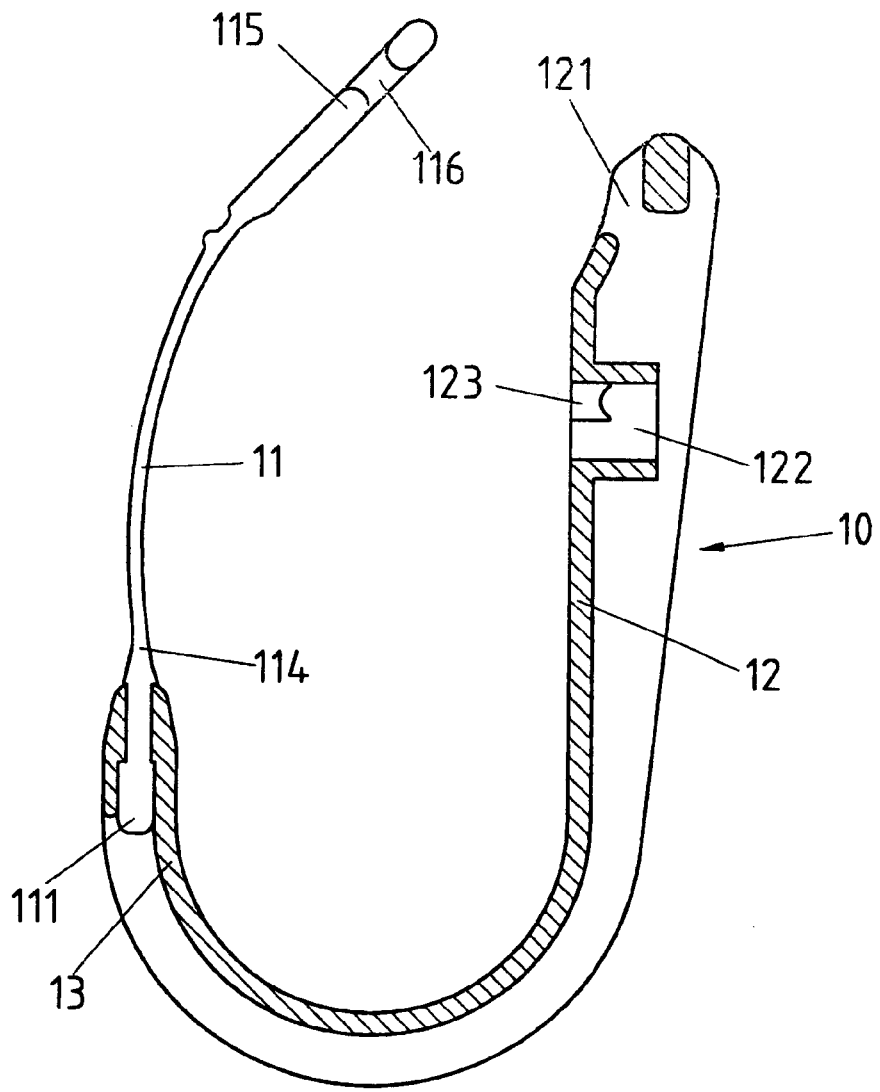
FIG. 4 shows a longitudinal sectional view of the present invention.
Figure 5:
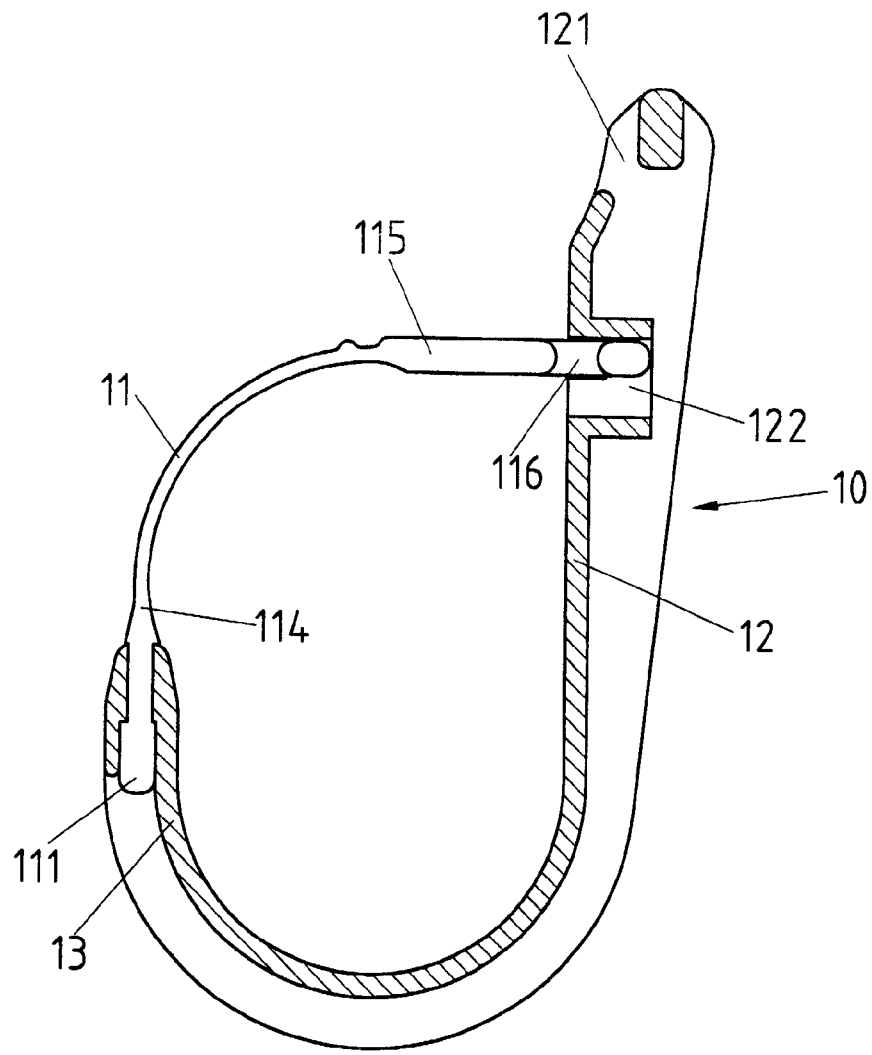
FIG. 5 shows another longitudinal sectional view of the present invention.

As shown in FIGS. 2–6, a frame of the present invention is formed of a main body 10 and a fastening strap 11.

The main body 10 has a straight wall 12 and a curved wall 13 extending from the straight wall 12. The main body 10 is provided at one longitudinal end with a through slot 121 and a retaining hole 122, and at other longitudinal end with a retaining slot 131 which is located at the free end of the curved wall 13.

The fastening strap 11 is provided at one longitudinal end with a retaining portion 115, and at the other longitudinal end with a fastening portion 111. The retaining portion 115 is provided with an arcuate neck portion 116. The fastening strap 11 is joined with the main body 10 such that the fastening portion 111 is fixedly retained in the retaining slot 131 of the main body 10, and such that the fastening portion 111 is located by a locating block 114 which is separated from the fastening portion 111 by a predetermined distance. The retaining portion 115 of the fastening strap 11 is detachably retained in the retaining hole 122 of the main body 10.

The retaining hole 122 is provided with a retaining block 123 for retaining the neck portion 116 of the fastening strap 11 at such time when the retaining portion 115 of the fastening strap 11 is retained in the retaining hole 122 of the main body 10.

The retaining block 123 of the retaining hole 122 of the main body 10 has an arcuate profile so as to accommodate the neck portion 116 of the fastening strap 11.

Figure 6:
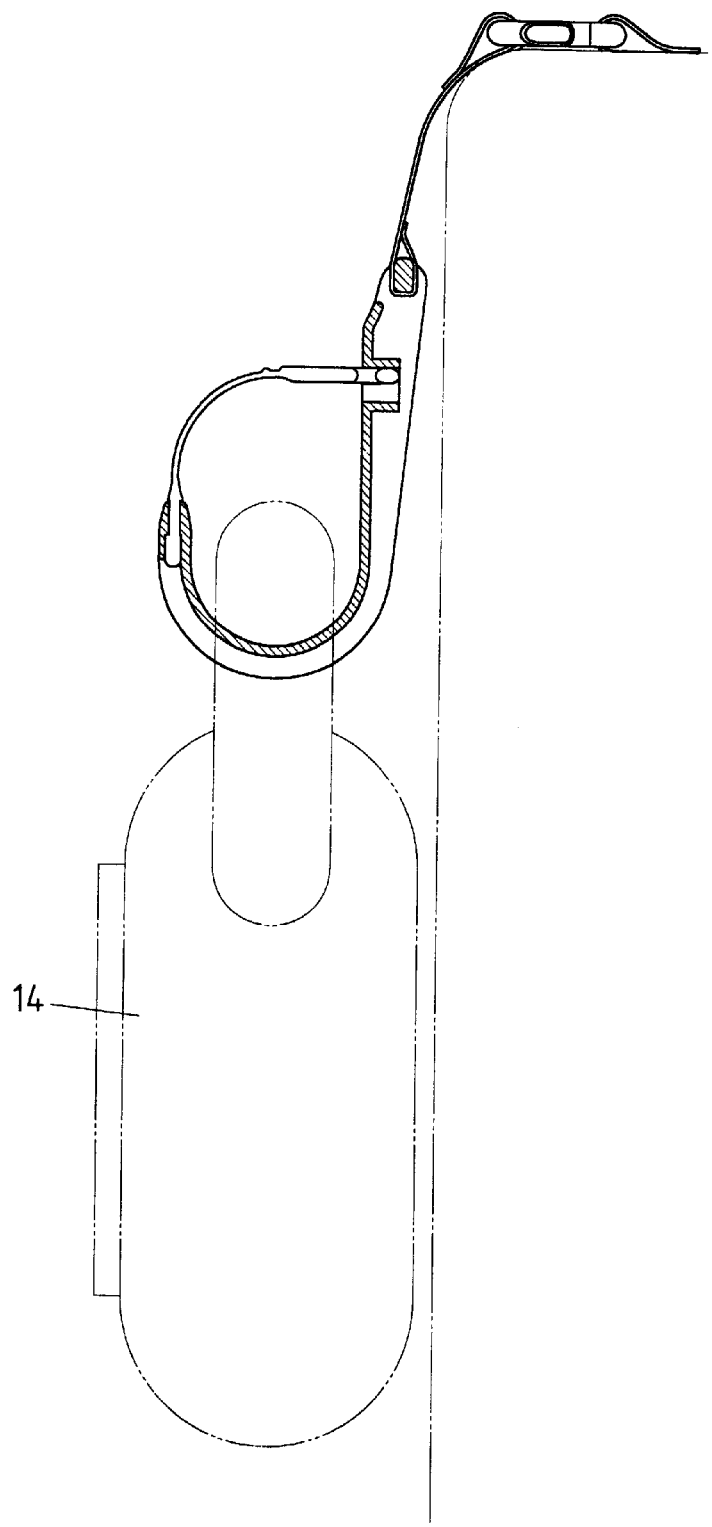
FIG. 6 shows a schematic view of the present invention at work.

As illustrated in FIG. 6, an article 14 is held by the frame of the present invention which is in turn attached to the luggage handle. In light of the neck portion 116 of the fastening strap 11 being securely located by the retaining block 123 of the retaining hole 122 of the main body 10, the article 14 is held securely to the outside of the luggage. The article 14 can be easily released from the frame of the present invention by pressing the fastening strap 11 gently so as to cause the neck portion 116 of the fastening strap 11 to separate from the retaining block 123 of the retaining hole 122 of the main body 10.

I claim:

1. A frame device for holding an article on an exterior of a piece of luggage comprising:

a main body having a straight wall and a curved wall extending from said straight wall, said main body having a through slot at one longitudinal end thereof and a retaining hole positioned below said through slot at an end of said curved wall, said retaining hole having an insertion area and a locking area positioned above said insertion area, said insertion area having a length greater than said locking area, said locking area having a retaining block at each opposite end thereof, said retaining block having an arcuate profile on a back surface thereof; and a fastening strap having a retaining portion at a longitudinal end thereof, said fastening strap having a fastening portion at an opposite end thereof, said retaining portion having an arcuate neck portion, said fastening portion insertable through said insertion area of said retaining hole, said arcuate neck portion releasably retained against the retaining blocks of said locking area, said fastening strap being joined to said main body such that said fastening portion is fixedly retained in said retaining slot of said main body.

2. The device of claim 1, said fastening strap having a locating block spaced by a predetermined distance from said fastening portion at said opposite end, said locating block juxtaposed against said end of said curved wall of said main body, said fastening portion residing inwardly of said retaining slot and against said curved wall adjacent said retaining slot.

* * * * *